3,470,146
SUSPENSION POLYMERIZATION OF VINYL
AROMATIC MONOMERS
William N. Maclay, Monroeville, Pa., assignor to Sinclair-Koppers Company, a partnership of Delaware
No Drawing. Filed May 26, 1967, Ser. No. 641,491
Int. Cl. C07f 1/74, 1/11
U.S. Cl. 260—93.5     3 Claims

ABSTRACT OF THE DISCLOSURE

The production of polymer beads or particles by suspending, as droplets, a vinyl aromatic monomer such as styrene having a free radical generating catalyst dissolved therein, in an aqueous medium with the aid of a finely divided phosphate suspending agent and a water soluble sulfite or precursor thereof, and heating the suspensions to cause the monomer to polymerize into polymer particles is improved by adding to the suspension, certain water soluble organic sulfides, for example, dithiodiglycol.

Background of the invention

Grim Patent 2,673,194 describes the suspension polymerization of vinyl aromatic monomers to polymer beads or particles by the use of an oil soluble oxygen liberating catalyst, such as benzoyl peroxide, in an aqueous medium with a suspending system which is comprised of finely divided, difficulty water soluble phosphates in the presence of an anionic surface active agent acting as an extender. As used in this art, compounds which act to increase the ability of the phosphate dispersant to stabilize suspensions are termed extender. As a practical matter, extenders enable the phosphate dispersant to maintain stable suspensions of greater amounts of monomer and/or polymer in the aqueous medium than the phosphate can disperse by itself. Among the extenders listed by Grim are sodium dodecylbenzene sulfonate, sodium tetradecyl sulfate, potassium stearate, and long chain alkyl sulfonates. The extender is present in amounts of 0.0005 to 0.05 percent by weight of total suspension.

The foregoing suspension systems produce polymer beads having a broad size range distribution with the individual beads ranging in diameter from less than 300 to above 2,000 microns. Although the average bead diameter which is produced can be controlled to some extent by varying the parameters of the system such as the ratio of suspending agent to extender or the ratio of suspending agent in extender to monomer, inevitably beads of a size either larger (oversize) or smaller (undersize) than is desired for a given purpose will be produced. Beads of a size outside the desired range must therefore be diverted to other uses. Beads having an extremely small size are called fines. The uses to which these fines can be put are limited so that a large inventory of commercially unusable product is built up which must either be discarded or subjected to expensive reprocessing.

Contributions towards solving the problem of oversize and undersize beads have been made. For example, the use of selected extenders in the aqueous suspension polymeriaztion of styrene, stabilized by a difficultly soluble phosphate, has reduced to a substantial extent the loss of product encountered by the former wide range of bead sizes produced. Hohenstein et al. Patent No. 2,652,392 reduces to some extent the loss occasioned by the production of fines by adding a water soluble persulfate to the aqueous suspension that is being stabilized by calcium phosphate. Harold A. Wright in an application Ser. No. 641,596 filed on even date herewith, which is assigned to a common assignee, describes a process which produces extremely narrow bead size distributions by adding to the phosphate stabilized system from about 0.0003 to 0.20 percent by weight, based on monomer, of a water soluble sulfite or precursor thereof before the droplets of monomer have reached the bead identity point. During the suspension polymeriaztion of monomer droplets in a turbulently stirred reactor, the size of the droplets continuously increases during polymerization of the monomer droplets until the droplets have reached a hardness or repellancy sufficient so that they no longer coalesce. This is termed the "bead identity point" and is readily recognized by those working in the art. This point varies with the suspending system and, using the phosphate, is usually at about 35–40% conversion of monomer to polymer.

Summary of the invention

Surprisingly, I have found that the suspension polymerization of vinyl aromatic monomers in an aqueous medium, stabilized by a difficultly soluble phosphate and having added thereto from about 0.0003 to about 0.20 percent by weight, based on monomer, of a water soluble sulfite or precursor thereof before the monomer droplets have reached the bead identity point, will produce beads having an extremely sharp bead size distribution when there is added to the suspension from about 0.05 to about 5.0 percent by weight, based on monomer, of an organic water soluble sulfide selected from the group consisting of (1) Thiodiglycol
(2) Dithiodiglycol
(3) Alkali metal salts of thiodiglycolic acid
(4) Alkali metal salts of dithiodiglycolic acid
(5) Ethoxylated thiodiglycols having the formula:

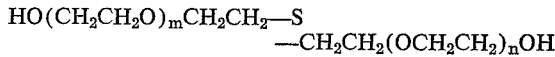

where $m$ and $n$ are integers from 1–10
(6) Ethoxylated dithiodiglycols having the formula:

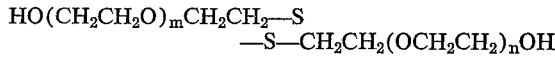

where $m$ and $n$ are integers from 1–10.

The sulfide must be added before the monomer droplets have reached the bead identity point.

Detailed description

The process of the invention is applicable to the suspension polymerization of vinyl aromatic monomers such as styrene, α-methylstyrene, mono- and di-chloro styrene, vinyl naphthalene as well as the copolymerization of vinyl aromatic monomers with, for example, such monomers as acrylonitrile, divinyl benzene, 2-ethylhexyl acrylate, diallyl esters of dibasic aliphatic aromatic acids, butadiene and polymers capable of further polymerization such as styrene-butadiene, styrene-isoprene, and polybutadiene rubbers.

The finely divided phosphates, difficultly soluble in water, useful as dispersing agents in the practice of the invention are conventional and are those described, for example, in Grim Patent 2,673,194. They include those phosphates containing for each phosphate group at least three equivalents of a metal, the carbonate of which is only slightly soluble in water, e.g., tricalcium phosphate, hydroxyapatite, magnesium phosphate, etc. Advantageously, the amount of phosphate to be employed ranges from about 0.20 to 1.1 percent by weight based on monomer. The average particle size of polymer beads produced in the suspension polymerization depends in part on the total amount of phosphate suspending agent. For example, suspensions with larger amounts of phosphate, suspending agent, yield beads of a smaller average particle size.

The presence of the sulfites or precursors thereof serves to reduce the amount of beads that have sizes larger or smaller than the average particle size and the presence of the water soluble organic sulfide serves to further reduce the amount of beads that have sizes larger or smaller than the average particle size, thus sharpening the bead size distribution even more than can be accomplished by the addition of sulfite alone.

The sulfites and precursors thereof are used in amounts of from about 0.0003 to 0.20 percent by weight based upon the weight of monomer. About 0.0003 percent of sulfite or precursor thereof is needed to produce a stable suspension and no appreciable increase in its effect is found when amounts greater than 0.20 percent are used. The sulfites or precursors thereof which are effective include, for example, sodium bisulfite, sodium metabisulfite, sodium hydrosulfide, sodium hydrosulfite, sodium formaldehyde sulfoxylate, sulfurous acid, potassium metalbisulfite, etc.

The amount of water soluble organic sulfide which has been found to be effective to produce the desired result varies from about 0.05 to 5.0 percent by weight based on the weight of monomer. If amounts below 0.05 percent by weight are used, no significant sharpening size of the bead size distribution is obtained. If amounts above 5.0 percent by weight are employed, a loss of suspension can occur and the sulfide may also retard the polymerization to an extent that complete conversion of monomer to polymer cannot be obtained. For maximum effect, the water soluble organic sulfide should be added prior to the start of polymerization. The addition of sulfide must be made prior to reaching the bead identity point to obtain any beneficial effect on bead size distribution.

The process of the invention may be used with monomer to water ratios which vary from 0.3 to 1.5 part by weight monomer per 100 part by weight water. The higher monomer to water ratios are preferred from an economic standpoint.

The time and temperature cycles for the polymerization may be those conventionally employed. Conveniently the two stage temperature cycle described in D'Alelio Patent 2,692,260 is used. For example, heating at 80–95° C. for at least about six hours is followed by heating at 110–120° C. for at least about 3 hours.

The free radical initiating catalysts which are added to the system are the oil soluble (and consequently monomer soluble) oxidation catalysts such as organic peroxides, for example, benzoyl peroxide, t-butyl perbenzoate, lauroyl peroxide, etc. Other free radical producing catalysts that may be used include azobisisobutyronitrile. Conventional amounts of such catalysts are used in this invention although somewhat larger amounts are employed that would be normally used in a given recipe in order to assure complete polymerization of the monomer. The total amount of catalyst should be at least about 0.15 percent by weight based on monomer. Slightly larger amounts of catalysts are required because the water soluble sulfides, which are known to inhibit aqueous phase polymerizations may have some retarding effect on the polymerization when they are used at the higher concentrations, even though the polymerization takes place in the oil phase. This is caused by either mechanical entrapment of the sulfide in the oil phase or slight solubility of the sulfides in the oil phase.

Detailed description

The invention is further illustrated by, but is not intended to be limited to, the following examples wherein parts are parts by weight.

EXAMPLE I

There were charged to each of a series of crown capped bottles 100 parts of water, 90.7 parts of the monomer, styrene, containing 0.25 part of the catalyst comprising a mixture of 0.20 part benzoyl peroxide and 0.05 part t-butyl perbenzoate, 1.0 part of the suspending agent, tricalcium phosphate, 0.005 part of sodium bisulfite, and the amount of dithiodiglycol shown in Table I below. The bottles were placed in an oil bath and agitated with end-over-end agitation for 7 hours at 92° C. after which time the temperature was raised during ½ hour to 115° C. and maintained at that temperature for 3 hours. The suspensions were then cooled and acidified with HCl to a pH of about 1.0 to dissolve the phosphate. The beads were separated from the aqueous medium by centrifuge, washed with water, and air dried. The beads from each bottle were separately screened into portions. The screen analysis, U.S. Standard Sieve, in percent by weight of polymer beads retained on each size screen is shown in Table I below.

TABLE I

| Polymerization | Parts of Dithiodiglycol | Screen Size Distribution, Weight Percent Polymer Retained on Screen No. (U.S. Standard Sieve) | | | | | | |
|---|---|---|---|---|---|---|---|---|
| | | 10 | 20 | 30 | 40 | 50 | 60 | Pan |
| I-1 | None | | 2.0 | 2.6 | 13.8 | 25.5 | 31.1 | 25.0 |
| I-2 | 0.065 | | 10.5 | 8.6 | 11.5 | 16.8 | 37.3 | 15.3 |
| I-3 | 0.13 | | 3.9 | 6.3 | 21.2 | 43.8 | 14.9 | 10.1 |
| I-4 | 0.25 | 0.5 | 8.7 | 15.9 | 68.3 | 5.3 | 1.0 | 0.5 |
| I-5 | 0.5 | 2.2 | 40.5 | 48.7 | 8.1 | 0.5 | | |
| I-6 | 1.0 | 0.9 | 99.1 | | | | | |

It can be seen that the increasing of the amount of dithiodiglycol progressively caused the average bead size to increase and the bead size distribution to sharpen until over 99 percent by weight of the beads passed through a 10 mesh screen and were retained in a 20 mesh screen. The example illustrates the usefulness of the process of the invention in furnishing relatively large beads within the useful range without the concurrent production of oversize beads.

EXAMPLE II

In order to illustrate the process of the invention in a system having a different level of sulfite, to a crown capped bottle there were added 100 parts of water, 90.7 parts of the monomer, styrene, containing 0.25 part of the catalyst comprising 0.20 part benzoyl peroxide and 0.05 part t-butyl perbenzoate, 1.0 part of the suspending agent, tricalcium phosphate, 0.0025 part of sodium bisulfite and 0.25 part of dithiodiglycol. As a control a second bottle was prepared in which the contents were the same except that the dithiodiglycol was omitted. The bottles were capped and rotated with end-over-end agitation in an oil bath at 92° C. for 7 hours after which the temperature was raised during ½ hour to 115° C. and maintained at that temperature for 3 hours. The suspensions were cooled to room temperature and acidified to a pH of about 1.0 with HCl to dissolve the phosphate. The beads were separated by centrifuge, washed with water, and air dried. The beads from each bottle were screened into portions. The screen analysis, U.S. Standard Sieve, in percent by weight of polymer beads retained on each size screen is shown in Table II below. The results show that a drastic sharpening of the bead size was achieved by the presence of dithiodiglycol in the system.

TABLE II

| Polymerization | Parts of Dithiodiglycol | Screen Size Distribution, Weight Percent Polymer Retained on Screen No. (U.S. Standard Sieve) | | | | | | |
|---|---|---|---|---|---|---|---|---|
| | | Screen No. | | | | | | |
| | | 10 | 20 | 30 | 40 | 50 | 60 | Pan |
| II-2 | None | 2.4 | 7.3 | 4.9 | 22.0 | 22.4 | 28.3 | 12.7 |
| II-1 | 0.25 | 0.5 | 26.6 | 61.8 | 11.1 | | | |

EXAMPLE III

The procedure of Example II-I was repeated using thiodiglycol in place of the dithiodiglycol and similar results were obtained.

EXAMPLE IV

The procedure of Example II-I was repeated using the disodium salt of dithiodiglycolic acid in place of the dithiodiglycol and similar results were obtained.

EXAMPLE V

The procedure of Example II-I was repeated using the water soluble organic sulfide

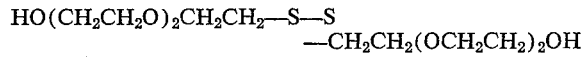
$HO(CH_2CH_2O)_2CH_2CH_2$—S—S
—$CH_2CH_2(OCH_2CH_2)_2OH$ in place of the dithiodiglycol and similar results were obtained.

EXAMPLE VI

In order to illustrate the specific nature of the improvement on bead size distribution obtained by using water soluble organic sulfides with bisulfite as opposed to other suspension systems employing a phosphate suspending agent a series of polymerizations were carried out. The suspending systems were: (1) a suspension system described by Grim 2,673,194; (2) a suspension system described by Hohenstein et al. 2,652,392; and (3) a suspension system described by Harold A. Wright in an application filed on even date herewith. In each case the polymerizations were carried out both with and without the addition of water soluble organic sulfide.

To each of a series of crown capped bottles there were added 100 parts of water, 90.7 parts of the monomer, styrene, containing 0.25 part of the catalyst comprising 0.20 part benzoyl peroxide and 0.05 part t-butyl perbenzoate, 1.0 part of the suspending agent, tricalcium phosphate, 0.005 part of either: (1) Nacconol NRSF (sodium dodecylbenzene sulfonate); (2) potassium persulfate; or (3) sodium bisulfite, and either 0 or 1.0 part of dithiodiglycol as shown in Table III below. The bottles were rotated with end-over-end agitation in an oil bath for 7 hours at 92° C. after which the temperature was raised to 115° C. during ½ hour and maintained at 115° C. for 3 hours. The suspensions were cooled and acidified to a pH of about 1.0 with HCl to dissolve the phospate. The beads recovered by centrifuge, were washed with water, and air dried. The beads from each bottle were separately screened into portions. The screen analysis, U.S. Standard Sieve, in percent by weight of polymer beads retained on each screen is shown in Table III below.

TABLE III

| Polymerization | Additive | Parts of Dithiodiglycol | Screen Size Distribution, Weight Percent Retained on Screen No. (U. S. Standard Sieve) | | | | | | |
|---|---|---|---|---|---|---|---|---|---|
| | | | Screen No. | | | | | | |
| | | | 10 | 20 | 30 | 40 | 50 | 60 | Pan |
| III-1 | Nacconol | None | | 2.0 | 3.5 | 21.0 | 14.7 | 16.1 | 42.7 |
| III-2 | do | 1.0 | | 1.3 | 3.3 | 33.8 | 17.5 | 13.6 | 30.5 |
| III-3 | K₂S₂O₈ | None | | 8.2 | 69.4 | 16.3 | 4.1 | 2.0 | |
| III-4 | K₂S₂O₈ | 1.0 | Suspension failed | | | | | | |
| III-5 | NaHSO₃ | None | | 0.7 | 1.3 | 6.5 | 7.1 | 24.5 | 60.0 |
| III-6 | NaHSO₃ | 1.0 | 2.5 | 96.3 | 0.6 | 0.6 | | | |

It can be seen from Table III that in the case of the Grim suspension system using Nacconol NRSF no appreciable effect was noted by adding a water soluble organic sulfide to the system either with regard to the average bead size produced or the bead size distribution. The effect of adding a water soluble organic sulfide to the Hohenstein system employing potassium persulfate was catastrophic as a failure of the suspension resulted. On the other hand, adding a water soluble organic sulfide to the bisulfite system drastically sharpened the bead size distribution such that over 96 percent of the beads passed through a 10 mesh and were retained on a 20 mesh screen.

EXAMPLE VII

In order to illustrate the effect of the time of addition of organic sulfide on bead size distribution the following series of polymerizations were carried out.

To each of a series of 12 ounce crown capped bottles there were added 100 parts of water, 90.7 parts of the monomer, styrene, containing 0.225 part of the catalyst comprising 0.18 part benzoyl peroxide and 0.045 part t-butyl perbenzoate, 1.0 part of the suspending agent, tricalcium phosphate, 0.005 part of sodium bisulfite and, at the time indicated in Table IV, except for the control, 1.0 part of dithiodiglycol. The bottles were placed in an oil bath, and heated, with end-over-end agitation, to 92° C. which took about ¾ hour. The temperature was maintained at 92° C. for 7 hours and then was raised to 115° C. during ½ hour and maintained at 115° C. for 3 hours. The bottles were cooled to room temperature and acidified with HCl to a pH of about 1.0 in order to dissolve the phosphate. The beads were separated by centrifuge, washed with water, and air dried. The beads from each bottle were screened into portions. The screen analysis, U.S. Standard Sieve, in percent by weight polymer beads retained on each size screen is shown in Table IV below.

TABLE IV

| Polymerization | Time (hours from start of heat-up) | Temperature, ° C. | Screen Size, Weight Percent Polymer Retained on Screen No. (U. S. Standard Sieve) | | | | | |
|---|---|---|---|---|---|---|---|---|
| | | | 20 | 30 | 40 | 50 | 60 | Pan |
| VII-1 | Control | | 1.2 | 2.6 | 7.7 | 35.3 | 19.3 | 33.9 |
| VII-2 | 0 | (1) | 100.0 | | | | | Trace |
| VII-3 | .75 | 92 | 26.9 | 60.1 | 12.7 | .04 | Trace | Trace |
| VII-4 | 1.75 | 92 | .9 | 1.3 | 4.6 | 14.5 | 18.3 | 60.3 |

¹ Room Temperature.

The results shown in Table IV indicate that delaying the addition of the organic sulfide even until the heat-up to polymerization temperature caused a reduction in the sharpening effect although the bead size distribution was still noticeably sharper than the control. However, delay of addition until after 1 hour at 92° C., or by the time the bead identity point was reached (about 35% conversion) showed that the bead size distribution was not improved and a large amount of very small beads resulted similar to the result obtained with the control.

I claim:
1. A process for producing polymer beads comprising suspending a vinyl aromatic monomer containing a free radical producing catalyst in an aqueous medium with the aid of a finely divided, difficulty water soluble phosphate suspending agent, subjecting the suspension to an elevated temperature to cause said monomer to polymerize, and adding to said suspension from about 0.0003 to about 0.20 percent by weight based on monomer of a water soluble sulfite precursor selected from the group consisting of sulfurous acid and the bisulfites, metabisulfites, hydrosulfites, hydrosulfides or formaldehyde sulfoxylates of sodium or potassium before the monomer has polymerized to the bead identity point and adding from about 0.05 to 5.0 percent by weight based on monomer of a water soluble organic sulfide selected from the group consisting of:
   (1) thiodiglycol
   (2) dithiodiglycol
   (3) alkali metal salts of thiodiglycolic acid
   (4) alkali metal salts of dithiodiglycolic acid
   (5) ethoxylated thiodiglycols having the formula:

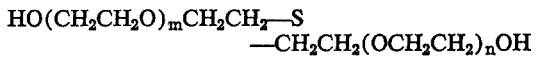

where $m$ and $n$ are integers from 1–10
   (6) ethoxylated dithiodiglycols having the formula:

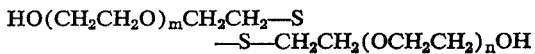

where $m$ and $n$ are integers from 1–10
prior to the time that the monomer has polymerized to the bead identity point.

2. The process of claim 1 wherein said sulfide is dithiodiglycol.

3. The process of claim 1 wherein said sulfide is added prior to the start of polymerization.

References Cited
UNITED STATES PATENTS

| | | | |
|---|---|---|---|
| 2,652,392 | 9/1953 | Hohenstein et al. | 260—93.5 |
| 2,948,710 | 8/1960 | D'Alelio et al. | 260—93.5 |
| 3,049,522 | 8/1962 | Lowell et al. | 260—93.5 |
| 3,328,374 | 6/1967 | Ronden et al. | 260—93.5 |

JAMES A. SEIDLECK, Primary Examiner

U.S. Cl. X.R.

260—78.5, 84.3, 85.5, 86.7, 88.2